(12) United States Patent
Bramani

(10) Patent No.: US 7,767,127 B2
(45) Date of Patent: Aug. 3, 2010

(54) METHOD FOR MANUFACTURING PERFORATED AND/OR TWO-COLOR COMPONENTS, PARTICULARLY FOR SHOES IN GENERAL

(75) Inventor: Marco Bramani, Albizzate (IT)

(73) Assignee: Vibram S.p.A., Albizzate (IT)

( * ) Notice: Subject to any disclaimer, the term of this patent is extended or adjusted under 35 U.S.C. 154(b) by 1051 days.

(21) Appl. No.: 11/142,299

(22) Filed: Jun. 2, 2005

(65) Prior Publication Data

US 2005/0276954 A1  Dec. 15, 2005

(30) Foreign Application Priority Data

Jun. 11, 2004  (IT) .......................... MI2004A1183

(51) Int. Cl.
  *B29C 65/02* (2006.01)
  *B32B 25/00* (2006.01)
  *B29D 35/14* (2010.01)
(52) U.S. Cl. ..................................................... 264/244
(58) Field of Classification Search .................. 264/244
  See application file for complete search history.

(56) References Cited

U.S. PATENT DOCUMENTS 3,785,900 A  1/1974  Gras 5,433,022 A *  7/1995  Lo et al. ...................... 36/30 R
5,940,994 A *  8/1999  Allen ........................... 36/168
6,508,015 B1  1/2003  Rauch
2005/0016023 A1  1/2005  Burris et al.

FOREIGN PATENT DOCUMENTS

EP  1 216 807 A  6/2002
GB  604 426 A  7/1948

\* cited by examiner

*Primary Examiner*—Christina Johnson
*Assistant Examiner*—Patrick Butler
(74) *Attorney, Agent, or Firm*—Jacobson Holman PLLC

(57) ABSTRACT

A method for manufacturing two-color components, for shoes in general, including the steps of positioning a sheet element, made of rubber, in a mold that forms a plurality of cavities delimited by edges the free end whereof lies on the parting plane of the mold. A sheet of plastic material which has a release function is then superimposed on the sheet element, and a layer is positioned on the sheet in order to give mechanical strength thereto. The mold is then closed with a cover, applying pressure together with heating in order to fill the cavities with the rubber and simultaneously move the rubber away from the edges. After removing the layer and the sheet together with any flash of rubber present on the edges, a second sheet element is superimposed, and pressure and heating are applied in order to produce bonding with the perforated sheet element; after this, the resulting article, which has a two-color appearance, is subjected to vulcanization.

18 Claims, 4 Drawing Sheets

METHOD FOR MANUFACTURING PERFORATED AND/OR TWO-COLOR COMPONENTS, PARTICULARLY FOR SHOES IN GENERAL

The present invention relates to a method for manufacturing perforated and/or two-color components, particularly for shoes in general.

BACKGROUND OF THE INVENTION

As is known, a sheet-like component for shoes, such as for example a sole, an insole, an insert and so forth, in two colors, is currently provided by using methods for manually assembling pre-molded inserts or injection-molding techniques or compression techniques and the like, which suffer severe limitations with respect to the complexity of the article that can be provided.

As is intuitive, it is in fact currently impossible to achieve high densities of elastomeric domains per unit surface, even domains that are completely separate from each other, since it would be necessary, if the inserts were applied manually, to apply an extremely large number of inserts, and this makes it inapplicable from an industrial standpoint. If one wishes to provide perforated regions, moreover, there would be very substantial problems in achieving uniform distribution of the material, if perforated regions with high density are to be obtained.

Another problem further consists in that in known two-color or multiple-color products, in order to have clear perimetric separation lines between one color and the other it is necessary to use molds that have containment borders along the entire perimetric color separation profile. These containment borders are indispensable in order to control the separation between one color and the other. These separation borders require each region or island of a certain color to be surrounded by a color dam in bas-relief, which acts as a separation element with respect to the base region affected by the other color.

SUMMARY OF THE INVENTION

The aim of the invention is to solve the problem described above by providing a method and a mold for obtaining perforated and/or two-color components, which allows to provide, starting from a layer of vulcanizable rubber or the like, a component provided with regions that are perforated at will and with optional two-color regions that may also be mutually separate, having a size and density that currently cannot be achieved.

Within this aim, an object of the invention is to provide rubber domains of different colors and/or having different chemical, physical and mechanical characteristics, which can be positioned and scattered in any manner, without thereby affecting appreciably the manufacturing costs and without having the color dam that surrounds each rubber domain.

Another object of the present invention is to provide a method for manufacturing perforated and/or two-color components that also allows to provide sheet-like components that have complex shapes with lateral rising portions.

Another object of the present invention is to provide a method that thanks to its particular constructive characteristics is capable of giving the greatest assurances of reliability and safety in use.

Another object of the present invention is to provide a method that can be easily obtained starting from commonly commercially available elements and materials and is further competitive from a merely economical standpoint.

This aim and these and other objects that will become better apparent hereinafter are achieved by a method for manufacturing perforated and/or two-color components, particularly for shoes in general, characterized in that it comprises the steps of: positioning a sheet-like element, made of rubber and the like, in a mold that forms a plurality of cavities delimited by edges the free end whereof lies on the parting plane of the mold; superimposing on said sheet-like element a sheet of plastic material which has a release function and on which a layer is positioned in order to provide mechanical strength to said sheet and facilitate the movement of the rubber away from said edges; closing said mold with a cover, applying pressure together with heating in order to fill said cavities with said rubber and the like and simultaneously move said rubber and the like away from said edges, and removing said layer and said sheet together with any flash of rubber and the like present on said edges.

BRIEF DESCRIPTION OF THE DRAWINGS

Further characteristics and advantages of the present invention will become better apparent from the description of a preferred but not exclusive embodiment of a method for manufacturing perforated components and of a method for manufacturing two-color sheet-like components, illustrated by way of non-limiting example in the accompanying drawings, wherein.

DESCRIPTION OF THE PREFERRED EMBODIMENTS

Figure 1:
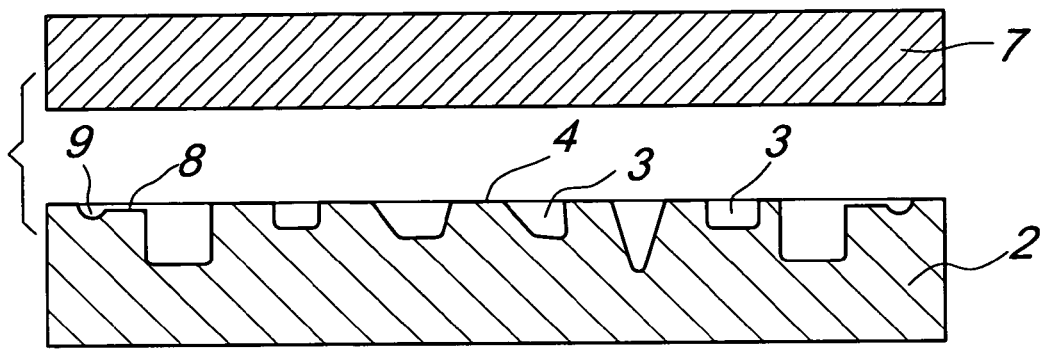
FIG. 1 is a schematic exploded sectional view of a mold and of a cover for obtaining a perforated sheet-like component.
Figure 2:
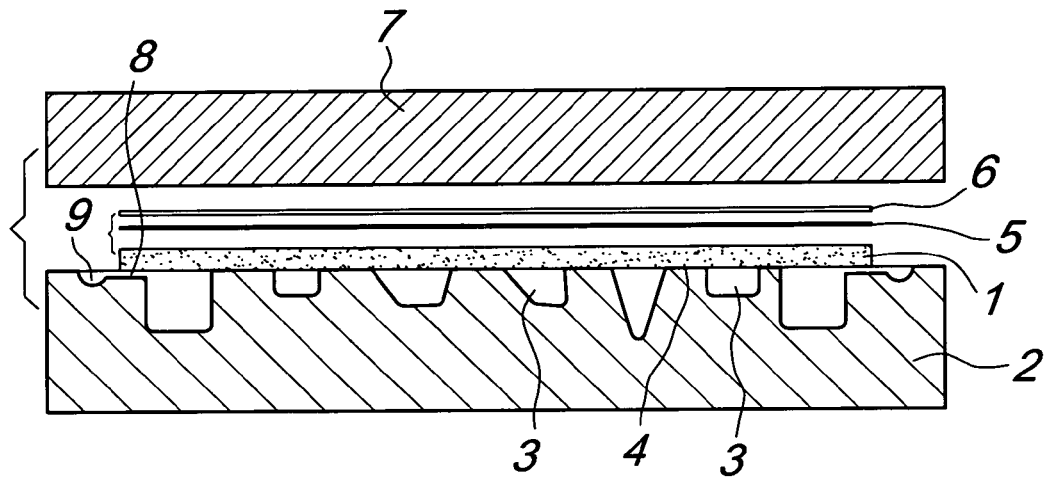
FIG. 2 is an exploded view of the mold after placing the sheet-like element and of the sheet and of the layer.
Figure 3:
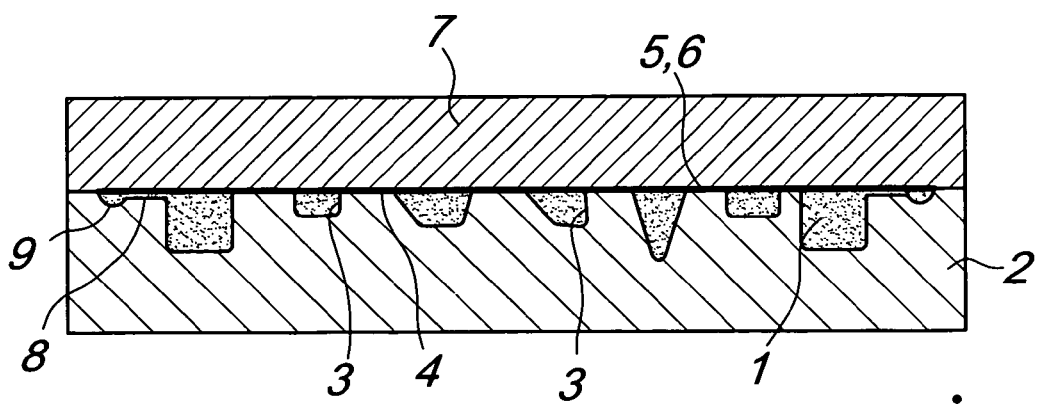
FIG. 3 is a view of the step for closing the mold with filling of the cavities.
Figure 4:
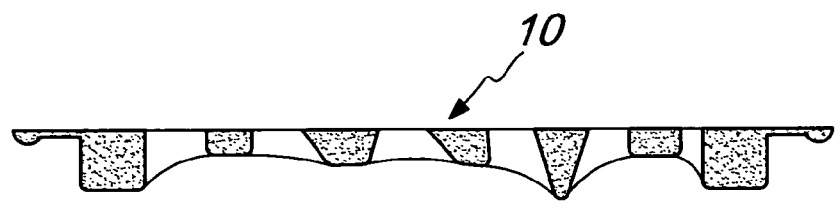
FIG. 4 is a schematic sectional view of the sole extracted from the mold.
Figure 5:
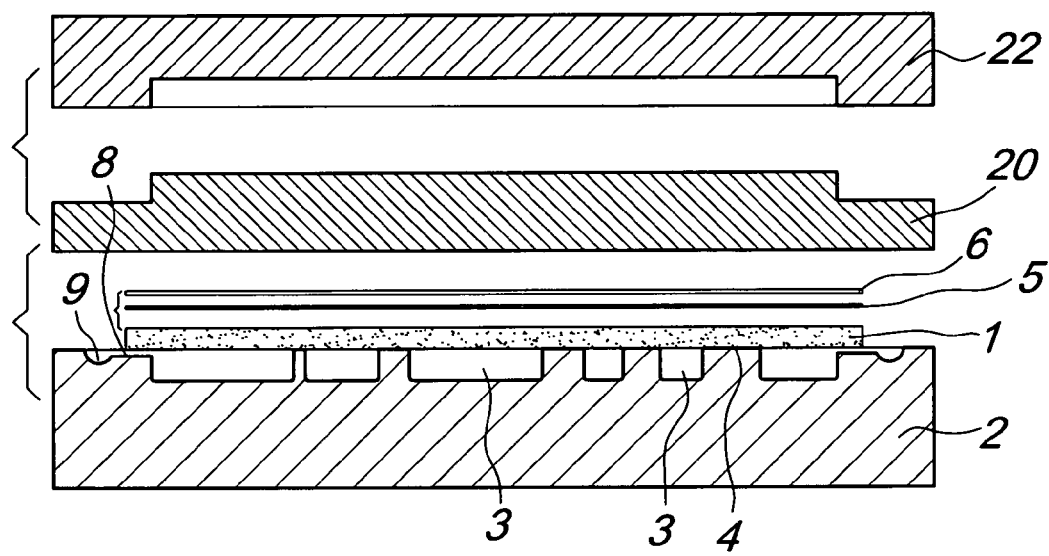
FIG. 5 is an exploded sectional view of a mold for obtaining a two-color sheet-like component, illustrating the various components.
Figure 6:
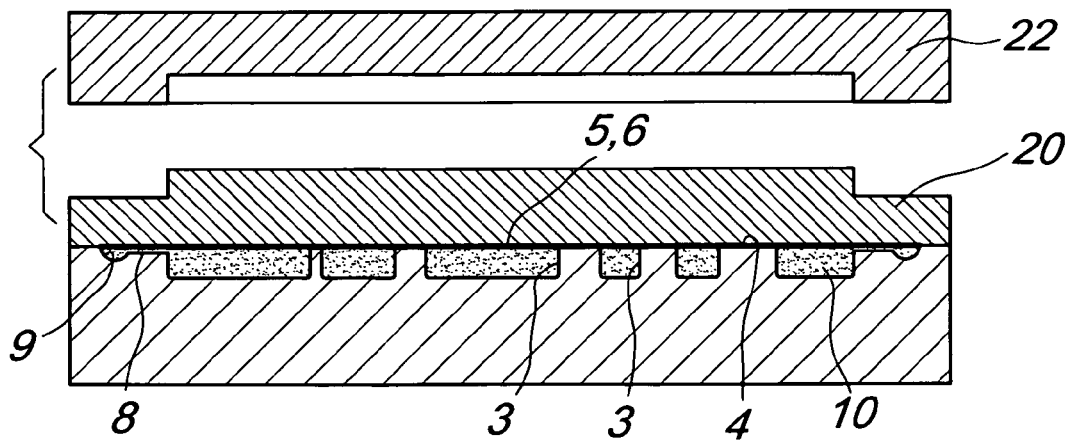
FIG. 6 is a sectional view of the step for providing the first color, with application of the intermediate cover in order to apply pressure.
Figure 7:
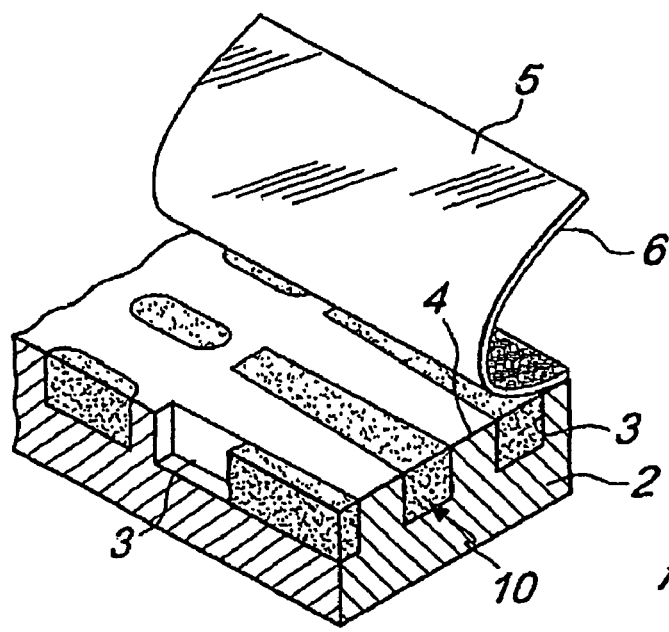
FIG. 7 is a view of the step for releasing the sheet and the layer.
Figure 8:
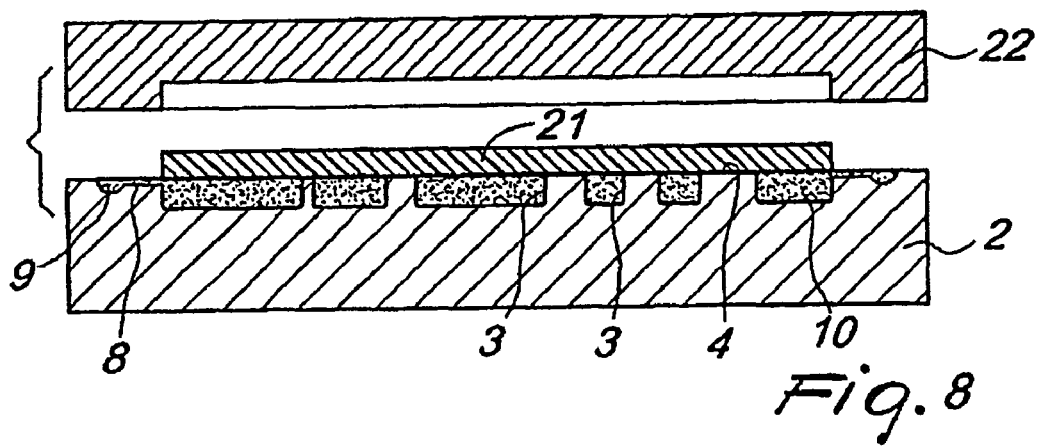
FIG. 8 is a view of the step for applying the layer of the second color.
Figure 9:
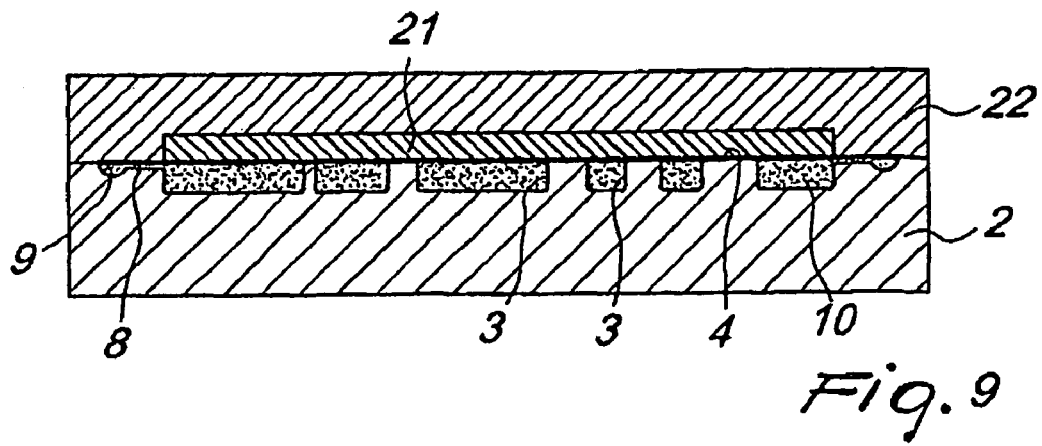
FIG. 9 is a view of the final molding step.
Figure 10:
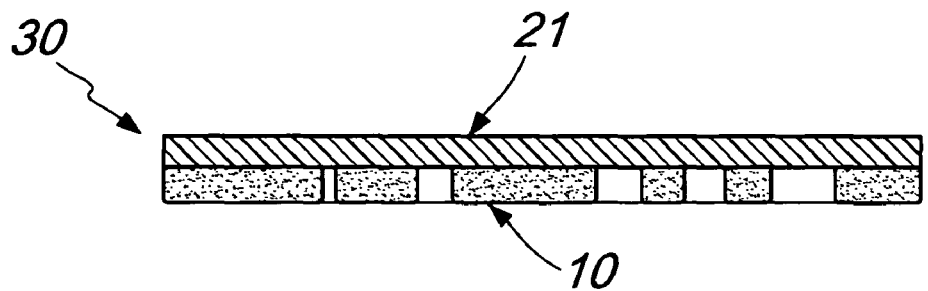
FIG. 10 is a sectional view of the resulting sheet-like component.

With reference to the figures, and particularly to FIGS. 1 to 4, the method for manufacturing perforated components, particularly for shoes in general, according to the invention, consists in positioning first of all a sheet-like element made of rubber or the like, designated by the reference numeral 1, on a mold 2, which forms a plurality of cavities 3, which are separated by edges 4, the free end whereof lies on the mold closure plane.

The expression "rubber and the like" is used to designate calendered products made of rubber, substantially constituted by mixtures of rubber that can be vulcanized both by sulfur cross-linking and accelerator agents with resin cross-linking or with peroxide cross-linking; the elastomers that are used most frequently can be constituted by isoprene rubber, butadiene rubber, butylene rubber, styrene butadiene rubber, nitrile rubber, natural rubber, ethylene and propylene with unsaturated monomer, silicone rubbers, chlorinated rubbers, ethylene vinyl acetate, and so forth.

Typically, the thickness of the sheet-like element 1, which is provided by a calendered product that has the shape of the mold 2, is advantageously comprised between 1 and 8 mm, with a thickness that depends in any case on the free volume of the final component to be provided, which in practice is a function of the type of cavities 3 that are provided.

A sheet 5 is arranged above the sheet-like element 1, has a release function and is preferably provided by means of a film of nylon or polyethylene with a thickness comprised between 15 and 100 µm, preferably between 20 and 40 µm.

The thickness of the film in itself does not have a function, since the thickness is meant exclusively to allow the sheet to withstand the molding conditions without splitting.

A layer 6 is applied over the sheet 5 and is preferably constituted by a piece of fabric that has the same template as the calendered product, is capable of withstanding the process temperatures and most of all is meant to give mechanical strength to the sheet 5 and perform a compressive effect at the edges 4 in order to facilitate the spacing of the rubber.

The fabric 6, besides being made of nylon and polyester, can also be made of reinforced fabrics, such as for example fabrics with aramid fibers or with natural fibers such as cotton, linen, and the like.

The thickness of the fabric is comprised between 0.2 and 2 mm, preferably 0.5-1.5 mm, so that the fabric does not break during molding and in practice adheres to the sheet of plastic material in order to allow its subsequent removal, as described in greater detail hereinafter, without tearing.

The sheet 5 is used as a release agent between the vulcanized rubber and the fabric, since without the sheet 5 it would not be possible to separate the fabric from the vulcanized rubber at the end of the cycle.

After positioning the sheet 5 and the layer 6, the mold is closed with a cover 7, by means of a compression press and by applying heat, which brings the mold to a temperature comprised between 140 and 220° C., preferably between 155° C. and 195° C.

The press is operated until the cover 7 is completely closed onto the mold 2, and closure is maintained for 10-30 seconds, so that the rubber and the like in practice fills the free volume between the bottom and the cover, duplicating the shape of the pattern formed by the cavities.

At the edges 4, where in practice there is contact closure between the bottom and the cover, the rubber is squeezed away by the presence of the fabric and at the most a minimal thin flash of rubber remains.

After the closure time, during which the rubber has practically filled the cavities and the excess rubber has been able to flow out owing to the presence of a recessed perimetric edge 8, which is surrounded by a compensation channel 9 for the excess material, the mold is opened and the assembly constituted by the sheet 5, made of the releasing thermoplastic film, and the fabric 6, which provides the chosen mechanical strength in order to prevent the sheet 5 from tearing during removal, is removed.

During removal of the sheet and of the layer, any small rubber parts that may have arranged themselves at the edges 4 and at the regions of contact closure are eliminated; in practice, said regions match the holes or changes in the pattern of the component that is provided.

Once selective filling of the mold has been achieved, it is possible to consolidate the resulting perforated sole 10 or to couple it to a midsole by simple thermoformation, if a two-color sole is to be provided.

To perform vulcanization, one simply closes the mold by using the same press used earlier and the rubber is vulcanized at 140° C. to 220° C. for times varying between 3 and 20 minutes; preferably, vulcanization is performed at 155° C. to 195° C. for times comprised between 4 and 15 minutes.

The molding conditions vary significantly depending on the thicknesses involved, on the type of fluid rubber that is used, on the accelerator system, and so forth.

If the resulting perforated sole is to be coupled to a midsole, a last made of thermoformable material is loaded and thermoformation is performed by using a cover that duplicates the shape of the insert.

If soles with conspicuous lateral rising portions are to be provided, it is preferable, after loading the calendered product 1 made of rubber or the like, to close the mold under pressure in order to preform the sheet-like rubber element, and after reopening the mold it is possible to proceed in the manner described above.

As shown in FIGS. 5 to 11, it is possible to provide two-color components, and in this case one proceeds as in the previously described case by applying the sheet-like element 1 on a mold 2, which is provided with the cavities 3 and the edges 4. Then the sheet 5 and the layer 6 are applied to the sheet-like element 1.

The closure step is performed with an intermediate cover, designated by the reference numeral 20, which in the initial step acts as in the preceding case, obtaining a component 10 in which regions are formed which correspond to the cavities 3 and in practice correspond to the first color.

After removing the sheet 5 by means of the layer 6, a second sheet-like element, designated by the reference numeral 21, is applied and positioned on the mold 2, in which there is the sheet-like element that has already been shaped so as to fill the cavities 3, which in practice form the first color, while the regions affected by the edges 4 affect the second color.

After the first molding step, similar to the step described earlier, and after removing the sheet 5 and the layer 6, the bottom of the mold has a selective filling of rubber of the first color, which has not yet been vulcanized, at the cavities 3, which in practice will constitute the elastomeric regions of the pattern to be provided by means of the first color.

There is no trace of rubber in the regions that correspond to the edges 4.

The second sheet-like element 21, made of the intended color, is then inserted in the mold and the closure of a contoured cover 22 is performed after removing the intermediate cover 20.

The thickness of the calendered product that constitutes the second sheet-like element will depend on the free volume formed by the contoured cover; said volume has to be filled with the second color and in particular is calibrated so as to load a slight excess with respect to the quantity that corresponds to the second free volume.

Figure 11:
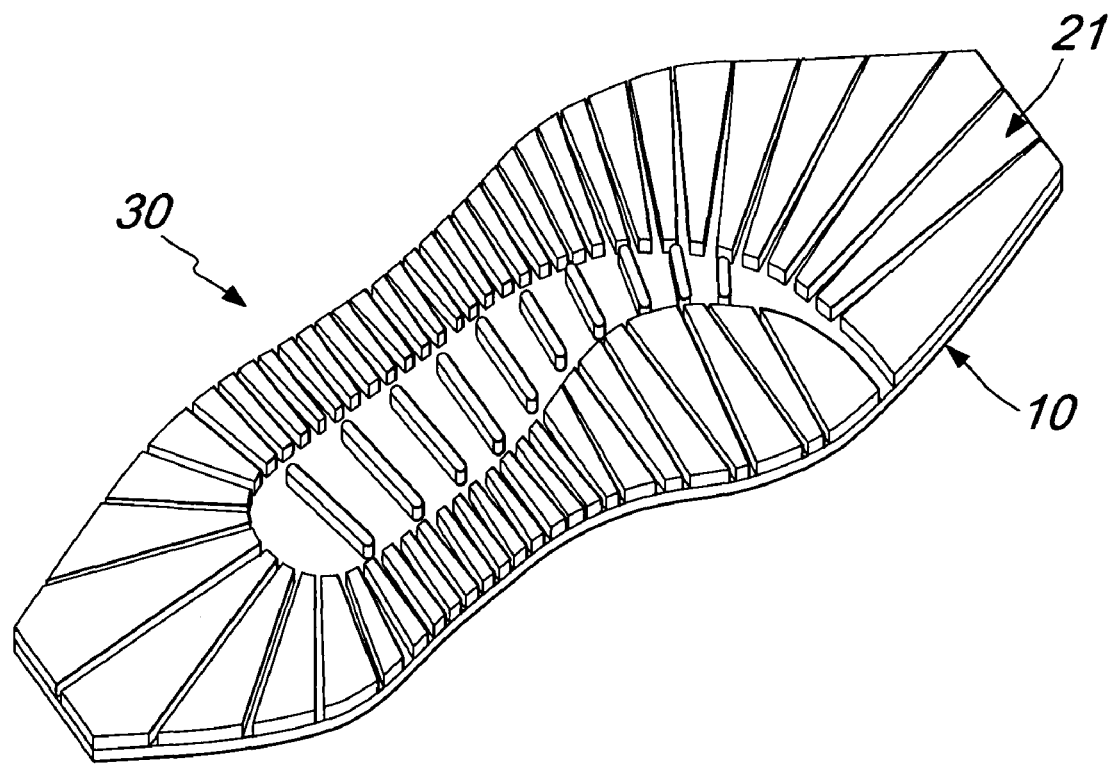
FIG. 11 is a schematic perspective view of the two-color sheet-like component.

Once the second sheet-like element has been positioned, the contoured cover 22 is closed onto the mold 2, performing vulcanization at a temperature comprised between 140° C. and 220° C. for times that vary between 3 and 20 minutes, preferably at a temperature between 155° C. and 195° C. for times comprised between 4 and 15 minutes, and after vulcanization the two sheet-like elements, in the two different colors, are perfectly fused together, and when the mold is opened a two-color sole 30 is extracted, as shown in FIG. 11, in which the patterns have an extremely high density of rubber domains of the first color and are dispersed in a backing region or layer of the second color, maintaining very sharp definitions without contaminations, without having to resort to the presence of the color dam that surrounds each domain, as occurs in the background art.

From what has been described above, it is therefore evident that the invention achieves the intended aim and objects, and in particular the fact is stressed that a method and a mold are provided which allow to provide sheet-like components for shoes in which it is possible to provide very small elastomeric domains that are densely packed per unit surface, an achievement that is industrially impossible if the domains have to be inserted manually, and it is also possible, if perforated soles are to be provided, to have an extremely high hole density, which cannot be achieved with conventional injection-molding processes.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2004A001183 from which this application claims priority are incorporated herein by reference.

What is claimed is:

1. A method for manufacturing perforated components for shoes, said method comprising the steps of
    positioning a sheet element, made of rubber, in direct contact with a surface of a mold that forms a plurality of cavities delimited by edges;
    superimposing on said sheet element a sheet of plastic material having a release function and on which a layer is positioned to provide mechanical strength to said sheet and to move the rubber away at regions of said mold with contact closure;
    closing said mold with a cover;
    applying pressure together with heating in order to fill said cavities with said rubber and simultaneously move said rubber away from said edges so that there is no trace of rubber in the regions that correspond to said edges; and
    removing said layer and said sheet of plastic material together with any flash of rubber present on said edges.

2. The method according to said claim 1, wherein said sheet element has a thickness between 1 and 8 mm.

3. The method according to claim 1, wherein said sheet made of plastic material has a thickness between 15 and 100 µm.

4. The method according to claim 1, wherein said layer is a layer of fabric.

5. The method according to claim 4, wherein said fabric has a thickness between 0.2 and 2 mm.

6. The method according to claim 1, wherein said heating occurs at a temperature between 140° C. and 220° C.

7. The method according to claim 1, wherein the pressure and the heating are maintained or a time between 10 and 30 seconds.

8. The method according to claim 1, wherein said mold has a recessed perimetric edge surrounded by a compensation channel to accommodate excess material.

9. The method according to claim 1, further comprising an initial step of performing said sheet element made of rubber to obtain sheet components with lateral rising portions.

10. A method for providing two-color components for shoes, said method comprising the steps of
    positioning a sheet element, made of rubber, in direct contact with a surface of a mold that forms a plurality of cavities delimited by edges;
    superimposing on said sheet element a sheet of plastic material having a release function and on which a layer is positioned to provide mechanical strength to said sheet and to move the rubber away from said edges;
    closing said mold with a cover;
    applying pressure together with heating to fill said cavities with said rubber and simultaneously move said rubber away from said edges so that there is no trace of rubber in the regions that correspond to said edges;
    removing said layer and said sheet of plastic material together with any flash of rubber present on said edges;
    superimposing a second sheet element;
    applying pressure together with heating to provide coupling of the second sheet element and the rubber remaining in the cavities and vulcanizing the rubber remaining in the cavities.

11. The method according to claim 10, wherein said sheet element has a thickness between 1 and 8 mm.

12. The method according to claim 10, wherein said sheet made of plastic material has a thickness between 15 and 100 µm.

13. The method according to claim 10, wherein said layer is a layer of fabric.

14. The method according to claim 13, wherein said fabric has a thickness between 0.2 and 2 mm.

15. The method according to claim 10, wherein said heating occurs at a temperature between 140° C. and 220° C.

16. The method according to claim 10, wherein the pressure and the heating are maintained for a time between 10 and 30 seconds.

17. The method according to claim 10, wherein said mold has a recessed perimetric edge surrounded by a compensation channel to accommodate excess material.

18. The method according to claim 10, further comprising an initial step of performing said sheet element made of rubber to obtain sheet components with lateral rising portions.

* * * * *